United States Patent [19]

Machmerth

[11] Patent Number: 4,506,968
[45] Date of Patent: Mar. 26, 1985

[54] PHOTOGRAPHIC CAMERA AND INTERCHANGEABLE LENS FOR USE THEREWITH

[75] Inventor: Herbert Machmerth, Solms, Fed. Rep. of Germany

[73] Assignee: Ernst Leitz Wetzlar GmbH, Wetzlar, Fed. Rep. of Germany

[21] Appl. No.: 532,904

[22] Filed: Sep. 16, 1983

[30] Foreign Application Priority Data

Sep. 18, 1982 [DE] Fed. Rep. of Germany ....... 3234725

[51] Int. Cl.³ .......................... G03B 3/00; G03B 17/14
[52] U.S. Cl. ..................................... 354/286; 350/255; 350/257
[58] Field of Search ................ 354/286, 400; 350/255, 350/257

[56] References Cited

U.S. PATENT DOCUMENTS 4,298,266  11/1981  Ludwig ............................... 354/286
4,413,894  11/1983  Miki et al. .......................... 354/286
4,449,807  5/1984  Miki et al. .......................... 354/286

Primary Examiner—A. A. Mathews
Attorney, Agent, or Firm—Schwartz, Jeffery, Schwaab, Mack, Blumenthal & Koch

[57] ABSTRACT

The camera includes a disengageable safety retaining catch for interchangeable lens objectives and an automatic focusing mechanism connected to a drive shaft for the transmission of rotary adjustment setting motions to the lens objective. The drive shaft operationally engages the automatic focusing mechanism via a drive and is provided with a spring supported in the axial direction. The rear end of the drive shaft is guided in a fixed bearing bushing. The front end is supported in a connection flange on the camera body. The front end is formed as a claw or toothed coupling element protruding beyond the connection flange and engages a complementary coupling piece which is disposed in a connection base on the lens objective.

10 Claims, 1 Drawing Figure

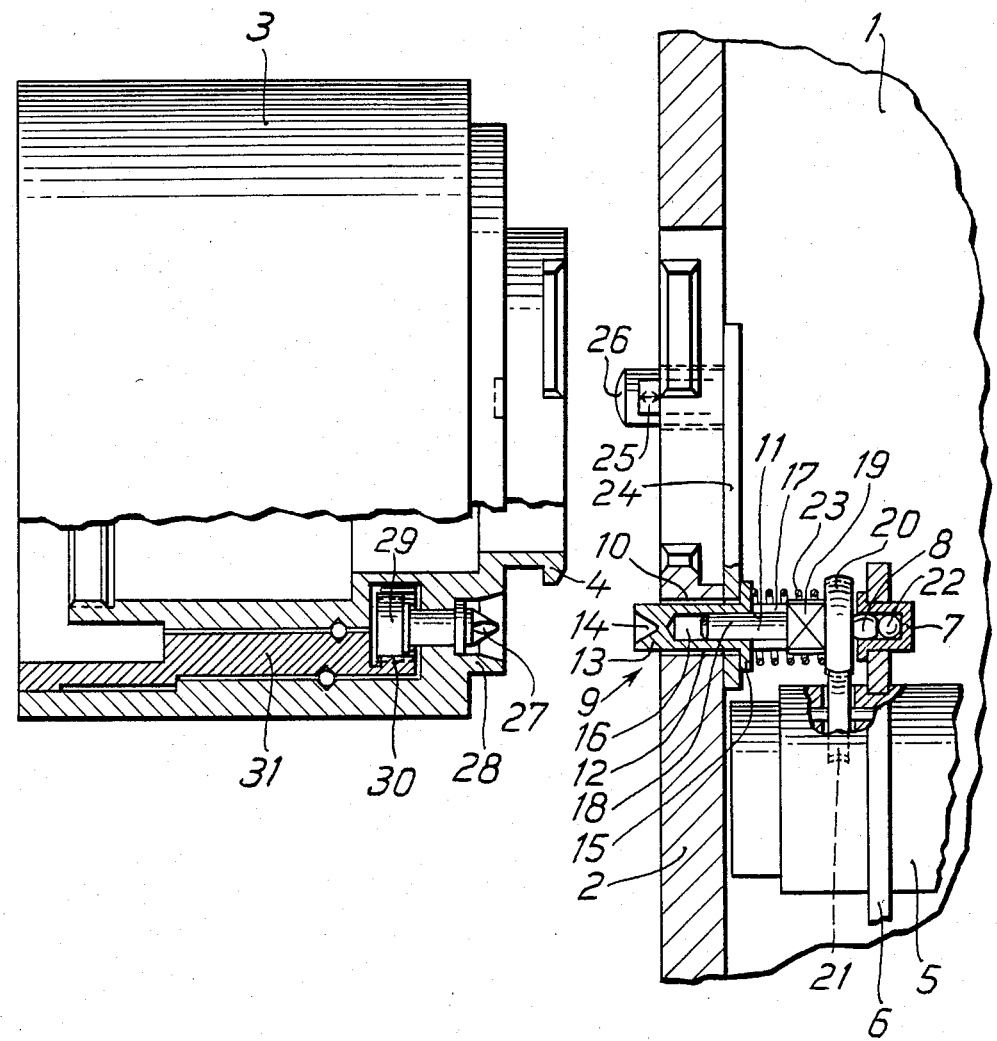

PHOTOGRAPHIC CAMERA AND INTERCHANGEABLE LENS FOR USE THEREWITH

BACKGROUND OF THE INVENTION

The present invention relates to a photographic camera with a releasable safety retaining catch for interchangeable lens objectives and which includes an automatic focusing mechanism.

Cameras of this type require that rotary adjustment motions be transferred to the interchangeable lens objectives from the camera body. These motions must be transferred in such a manner as to be as free from play as possible.

German Patent Application Laid Open DE-OS No. 2,951,433 discloses a camera in which adjustment setting motions generated in the camera body are transferred via friction wheels to the setting elements in the objective. However, one disadvantage associated with such a mechanism is the very high energy loss caused by slippage of the friction wheels.

It has been proposed in German Patent Application Laid Open DE-OS No. 2,941,601 that a telescopically extendable force transmission shaft be used for tensioning sector shutters disposed in an interchangeable lens objective. The telescopically extendable force transmission shaft is disposed on the objective and is driven with a drive shaft on the camera body for tensioning the spring force storage mechanism for the shutter sector drive. This arrangement is manually operable upon attachment of the objective. Again, a disadvantage of such a coupling is that high frictional loss occurs. Also, distortions of the transmitted movement and binding of the movable axial parts to be coupled may occur based on parallel and axial misalignments.

SUMMARY OF THE PRESENT INVENTION

An object of the present invention is to provide a coupling for the transmission of rotary adjustment setting motions in a photographic camera having interchangeable lens objectives and an automatic focusing mechanism.

A further object of the present invention is to provide a coupling in which distortions in transmitted movement and binding of components due to parallel and axial misalignments are compensated for.

An additional object of the present invention is to provide a coupling between a camera body and a camera objective which includes a releasable safety retaining mechanism.

In accordance with the above and other objects, the present invention is a photographic camera comprising a camera body, a releasable safety retaining catch on the camera body for attachable interchangeable lens objectives, and a drive shaft on the camera body for the transmission of rotary set motions to an interchangeable lens objective attached to the camera body. A drive for operationally connecting an automatic focusing mechanism to the drive shaft is provided, and a spring biases the drive shaft in the axial direction. A fixed bearing bushing is mounted in the camera body and supports a rear portion of the drive shaft. A connection flange on the camera body mounts an interchangeable lens objective, and a forward portion of the drive shaft is supported in the connection flange and protrudes beyond the connection flange. The forward portion is provided as a coupling element. An interchangeable lens objective is provided comprising a connection base and a coupling piece recessed in the connection base. The coupling piece has a forward end formed complementary to the coupling element of the drive shaft, whereby when the lens objective is attached to the camera body, the coupling element engages the coupling piece.

The drive shaft compriss two part shafts connected such that they are not rotatable relative to each other but are axially slidable with respect to each other. One part shaft is constructed as a bushing for the other part shaft and is spring loaded with respect to the other part shaft.

The connection between said part shafts may be a pin and slot connection provided to guard against rotary motion of the part shafts against each other, or the connection may comprise a guide groove extending axially along one of the part shafts and a spline formed in the other part shaft and engaging the guide groove.

In accordance with other aspects, the invention comprises the rear end of the drive shaft guided in the bearing bushing being formed as a ball and the front part of the drive shaft being supported in the connection flange with play between the drive shaft and the connection flange.

Also, an operating connection is provided between the safety retaining catch and the drive shaft. The operating connection effects simultaneous decoupling of the drive shaft and the coupling piece upon actuation of the safety retaining catch.

BRIEF DESCRIPTION OF THE DRAWING

The above and other objects of the present invention will become more readily apparent when the invention is more completely understood from the detailed description below, reference being had to the accompanying drawing in which like reference numerals represent like parts throughout, and which shows an elevational, part sectional view of a camera according to the present invention.

DETAILED DESCRIPTION OF THE PREFERRED EMBODIMENT

The present invention comprises a camera having a drive shaft disposed on the camera body operationally engaged with an automatic focusing mechanism via a drive. The drive shaft is disposed under spring loading in the axial direction and is provided for the transmission of rotary adjustment setting motions to the interchangeable lens objective attached in each case to the camera body. The rear end of the drive shaft is guided by a bearing bushing fixed with respect to the drive and the front end of the drive shaft is supported in a connection flange provided on the camera body to support the interchangeable lens objective. The drive shaft protrudes beyond the connection flange and has an exposed front end formed as a claw or tooth coupling element. Upon attachment of an interchangeable objective, the coupling element engages a coupling piece which is disposed on the objective and which is formed complementary to the front end of the drive shaft.

The FIGURE schematically shows a camera casing 1 having a connection flange 2 for the reception of an interchangeable lens objective 3 disposed at the front side of the casing 1 and an interchangeable lens objective attachable by a bayonet ring 4 to the camera casing 1. A drive 5 is operationally connected to a focusing mechanism (not shown) via a platen 6 in the camera casing 1. A bearing bushing 7 is received in the platen 6 and the rear end 8 of a drive shaft 9 is guided in the bushing 7. The drive shaft 9 comprises two part shafts 10 and 11. The part shaft 10 is formed as a bushing and is supported and guided with play in a bore 12 in the connection flange 2. A toothed recess 14 is milled into the end 13 of the part shaft 10 protruding beyond the connection flange 2. The part shaft 10 is provided at its other end 15 with a bore 16 and with a guide groove 17.

The part shaft 11 includes a bearing journal 18 which slides in the bore 16. The guide groove 17 slides along a two piece spline 19 disposed behind the bearing journal. Spline 19 serves as a guide member and thus the guide groove assures that the part shafts 10 and 11 will not rotate relative to one another but can slide axially relative to each other.

The partial shaft 11 also carries a pinion 20, which meshes with a gear wheel 21 of the drive 5.

A helical spring 23 is disposed between support positions on the part shafts 10 and 11 to press the part shaft 10 axially away from part shaft 11 toward connection flange 2. The rear end 8 of drive shaft 9 is ball shaped and is guided in the bearing bushing 7 of the drive shaft 9. The front face of ball shaped end 8 is pressed against a ball 22 inserted into the bearing bushing 7 in order to decrease friction.

The drive shaft 9 is operationally connected via a lever 24 with a safety retaining catch for the lens objective represented by a safety catch bolt 25 which protrudes through the connection flange 2. The drive shaft 9 and the safety catch bolt 25 can be moved behind the front face of the connection flange 2 by actuation of a press pin 26 mounted to the lever 24. Press pin 26 protrudes through the connection flange 2.

The interchangeable lens objective 3 is provided with a coupling piece 27 which is rotatably guided and supported in a connection base 28 of the bayonet ring 4. Coupling piece 27 has an end profile formed complementary to toothed recess 14 in the end 13 of part shaft 10, and is received in this recess when objective 3 is attached to camera casing 1. Adjustment setting motions of shaft 9 are transferred through coupling piece 27. The coupling piece 27 carries a pinion 29 at the end disposed oppositely to the coupling profile, which pinion engages a toothed wheel rim 30. Toothed wheel rim 30 is disposed on a setting adjustment ring 31 which effects adjustment of the lens objective 3.

Parallel and axial misalignments between the drive shaft 9 and the coupling piece 27 are automatically compensated within certain limits by the part shaft 10 being supported with play in connection flange 2 as well as by way of the end 8 of part shaft 11 being formed as a ball.

The foregoing description is presented for the purpose of illustrating the present invention and is not deemed to limit the scope thereof. Clearly, numerous modifications could be made to the invention without departing from the scope thereof as defined in the appended claims.

What is claimed is:

1. Photographic camera comprising:
  a camera body;
  a releasable safety retaining catch on said camera body for attachable interchangeable lens objectives;
  a drive shaft on said camera body for the transmission of rotary motions to an interchangeable lens objective attached to the caera body, wherein the drive shaft comprises two part shafts connected such that they are not rotatable relative to each other but are axially slidable with respect to each other;
  a drive for operationally connecting an automatic focusing mechanism to the drive shaft;
  a spring biasing the drive shaft in the axial direction;
  a fixed bearing bushing mounted in the camera body and supporting a rear portion of the drive shaft;
  a connection flange on the camera body for mounting an interchangeable lens objective, a forward portion of said drive shaft being supported in said connection flange and protruding beyond the connection flange, the forward portion being provided as a coupling element; and
  an interchangeable lens objective comprising a connection base and a coupling piece recessed in the connection base, said coupling piece having a forward end formed complementary to said coupling element of the drive shaft, whereby when said lens objective is attached to said camera body, said coupling element engages said coupling piece.

2. Photographic camera according to claim 1, wherein one part shaft is constructed as a bushing for the other part shaft and is spring loaded with respect to the other part shaft.

3. Photographic camera according to claim 1, wherein said connection between said part shafts is a pin and slot connection provided to guard against rotary motion of the part shafts against each other.

4. Photographic camera according to claim 1, wherein said connection comprises a guide groove extending axially along one of said part shafts and a spline formed in the other part shaft and engaging the guide groove.

5. Photographic camera according to claim 1, wherein the rear end of the drive shaft guided in the bearing bushing is formed as a ball and the front part of the drive shaft is supported in the connection flange with play between the drive shaft and the connection flange.

6. Photographic camera according to claim 1, wherein the rest end of the drive shaft guided in the bearing bushing is formed as a ball and the front part of the drive shaft is supported in the connection flange with play between the drive shaft and the connection flange.

7. Photographic camera according to claim 2, wherein the rear end of the drive shaft guided in the bearing bushing is formed as a ball and the front part of the drive shaft is supported in the connection flange with play between the drive shaft and the connection flange.

8. Photographic camera according to claim 1 further including an operating connection between the safety retaining catch and the drive shaft, said operating connection being operative to effect simultaneous decoupling of the drive shaft and the coupling piece upon actuation of the safety retaining catch.

9. Photographic camera according to claim 1, wherein said coupling piece comprises a clawed element.

10. Photographic camera according to claim 1, wherein said coupling piece comprises a toothed element.

* * * * *